United States Patent
Blank et al.

(10) Patent No.: US 10,315,655 B2
(45) Date of Patent: Jun. 11, 2019

(54) VEHICLE CONTROL BASED ON SOIL COMPACTION

(71) Applicant: Deere & Company, Moline, IL (US)

(72) Inventors: Sebastian Blank, Bettendorf, IA (US);
Kristen A. Blank, Bettendorf, IA (US)

(73) Assignee: Deere & Company, Moline, IL (US)

( * ) Notice: Subject to any disclaimer, the term of this patent is extended or adjusted under 35 U.S.C. 154(b) by 25 days.

(21) Appl. No.: 15/452,066

(22) Filed: Mar. 7, 2017

(65) Prior Publication Data
US 2018/0257657 A1    Sep. 13, 2018

(51) Int. Cl.
| | |
|---|---|
| B60W 30/18 | (2012.01) |
| G05D 1/02 | (2006.01) |
| B60W 50/14 | (2012.01) |
| B60W 10/20 | (2006.01) |
| B60W 10/30 | (2006.01) |
| A01D 75/00 | (2006.01) |
| E02F 9/26 | (2006.01) |

(52) U.S. Cl.
CPC ....... *B60W 30/18181* (2013.01); *A01D 75/00* (2013.01); *B60W 10/20* (2013.01); *B60W 10/30* (2013.01); *B60W 30/18172* (2013.01); *B60W 50/14* (2013.01); *E02F 9/262* (2013.01); *G05D 1/0219* (2013.01); *G05D 1/0276* (2013.01); *B60W 2050/143* (2013.01); *B60W 2050/146* (2013.01)

(58) Field of Classification Search
CPC combination set(s) only.
See application file for complete search history.

(56) References Cited

U.S. PATENT DOCUMENTS

| | | | |
|---|---|---|---|
| 6,130,215 A | 10/2000 | Jakoczi et al. | |
| 7,302,837 B2* | 12/2007 | Wendte | B60C 23/002 340/442 |
| 9,066,465 B2 | 6/2015 | Hendrickson et al. | |
| 2008/0063473 A1* | 3/2008 | Congdon | E01C 19/288 404/75 |
| 2013/0046419 A1 | 2/2013 | Anderson et al. | |
| 2014/0236381 A1 | 8/2014 | Anderson et al. | |
| 2016/0066505 A1 | 3/2016 | Bakke et al. | |

FOREIGN PATENT DOCUMENTS

| | | |
|---|---|---|
| EP | 22657566 A2 | 3/2010 |
| WO | 2011063814 A1 | 6/2011 |
| WO | 2014130330 A1 | 8/2014 |

* cited by examiner

*Primary Examiner* — Thomas G Black
*Assistant Examiner* — Ana D Thomas
(74) *Attorney, Agent, or Firm* — Joseph R. Kelly; Kelly, Holt & Christenson, PLLC

(57) ABSTRACT

Mobile machine characteristics and position are sensed to obtain an indication of the compactive effect of a mobile machine on a worksite. A soil compaction stress map is generated and control signals are generated, for controlling controlled systems, based upon the soil compaction stress map.

12 Claims, 11 Drawing Sheets

VEHICLE CONTROL BASED ON SOIL COMPACTION

FIELD OF THE DESCRIPTION

The present description relates to identifying soil compaction at a worksite. More specifically, the present description relates to generating control signals for controlling an operation based on identified soil compaction.

BACKGROUND

Mobile machines work in a variety of different types of worksites. For instance, agricultural machines work in a field. Construction machines work at a construction site. Turf management machines operate in turf growing sites. In all of these sites, the mobile machines can be machines that are propelled with wheels or tracks or other ground-engaging elements. Therefore, the machines can cause soil compaction in the areas over which they drive.

The soil compaction can impact various items at the worksite. For instance, at a construction worksite, soil compaction can affect the ability of equipment to penetrate the soil, and it can also affect the traction of mobile machines over the worksite. In a turf growing site, or in an agricultural field, soil compaction can also affect the performance of the turf or crop. If soil becomes highly compacted around the turf or crop, this can mean that less water and less nutrients reach the roots of the plant, because the soil is more difficult to penetrate. This can affect the growth of the turf and the yield of the crop.

This problem can be exacerbated in crops that are perennial crops or that can go without replanting for several years. Such crops can include such things as sugar cane, alfalfa, etc. In these types of scenarios, the soil compaction can accumulate over years and exacerbate the problems caused by soil compaction.

By way of example, sugarcane is a "perennial" crop or a crop that only needs to be replanted after several years. Some sugarcane operations are quite large, and may include as many as 50-150 harvesting machines organized in fronts. Each front may have 5-10 harvesters with 10-20 tractors (and corresponding carts). Each front may also have one or more semi-trucks for transporting the sugarcane from the field to processing facility. All of these different mobile machines may travel across some or all of the sugarcane field during harvesting operations. The soil compaction imparted by these machines, traveling over the field, can be detrimental to the performance of the sugarcane crop.

In order to measure soil compaction, some current systems include bulk density or soil cone penetrometer measurements. Some current systems also use Bolling pressure probes, or other similar devices. These methods of measurement are relatively time consuming and depend on user experience and skill. In addition, they are only locally applicable. The measurements are only taken in parts of any given field, and therefore the results are incomplete. They do not offer a complete assessment of the compaction state of the field. Also, because the measurements can be interpreted in different ways, there is a relatively high uncertainty corresponding to these types of measurements. Furthermore, they can be invasive and can potentially damage the crop.

The discussion above is merely provided for general background information and is not intended to be used as an aid in determining the scope of the claimed subject matter.

SUMMARY

Mobile machine characteristics and position are sensed to obtain an indication of the compactive effect of a mobile machine on a worksite. A soil compaction stress map is generated and control signals are generated, for controlling controlled systems, based upon the soil compaction stress map.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
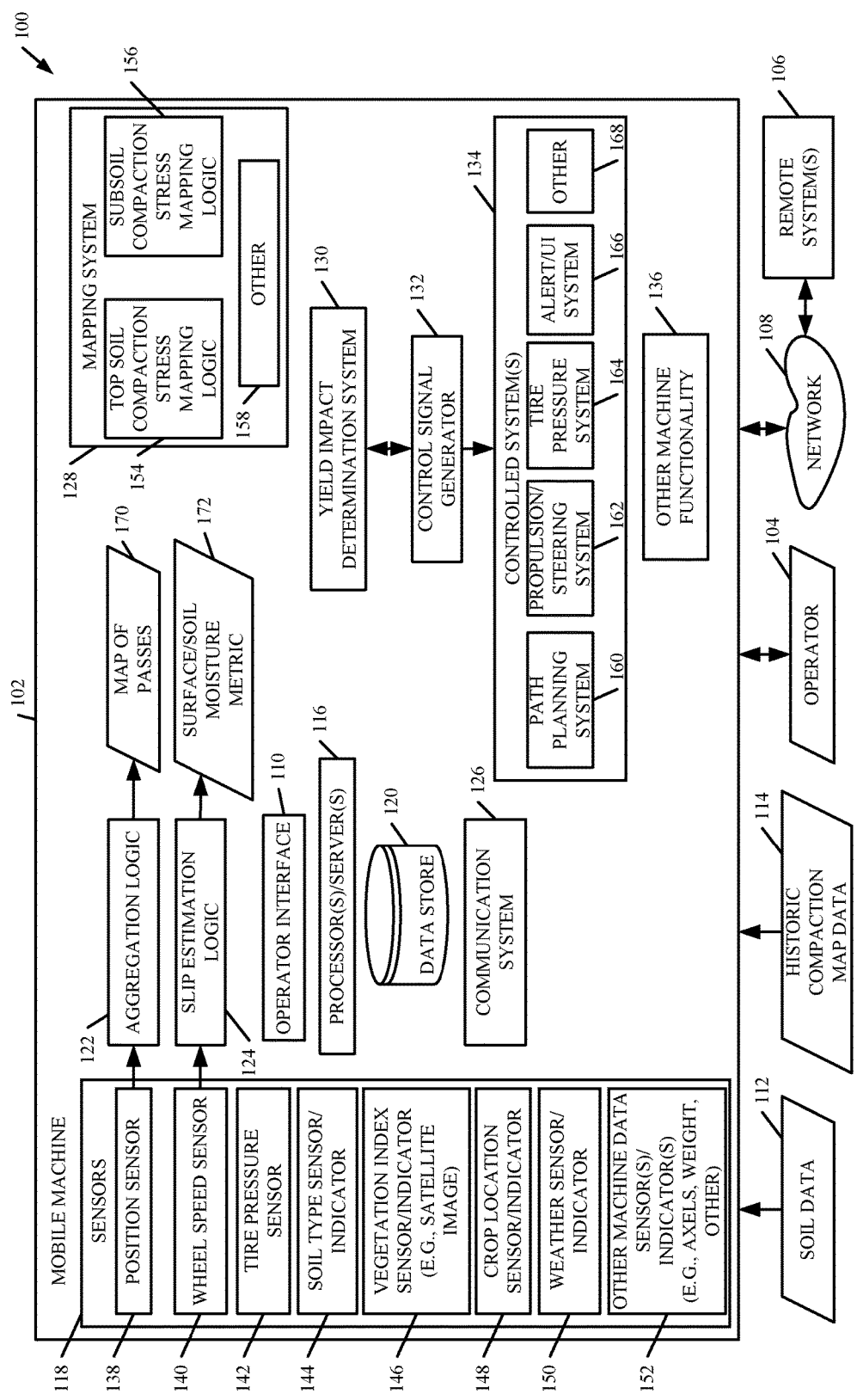
FIG. 1 is a block diagram of one example of a mobile machine architecture.

FIG. 1 is a block diagram of one example of a mobile machine architecture 100. Architecture 100 illustratively includes mobile machine 102 that has an operator 104. Mobile machine 102 may also communicate with one or more remote systems 106 over a network 108. Network 108 can be any of a wide variety of different types of networks, such as a wide area network, a local area network, a cellular network, a close field communication network, a network that involves store-and-forward technology, among a wide variety of others, some of which are described in more detail below.

Mobile machine 102 can be any of a variety of different mobile machines, such as an agricultural machine, a construction machine, a turf management machine, among others. By way of example only, mobile machine 102 may be a sugarcane harvester, a combine harvester, a tractor, or any of a wide variety of other agricultural machines.

Operator 104 illustratively interacts with mobile machine 102 through one or more operator interfaces 110, in order to control and manipulate mobile machine 102. Operator interfaces 110 may include, for instance, pedals, levers, a steering wheel, a joystick, a visual display, touch sensitive display elements (such as icons, links, buttons, etc.), or a wide variety of other user interfaces. The user interfaces 110 can include a wide variety of user input mechanisms, and they can also include output mechanisms. The output mechanisms may include, for instance, audible output mechanisms, haptic output mechanisms, visual display mechanisms, or a wide variety of other items.

Architecture 100 also shows that mobile machine 102 can receive soil data 112 and historical compaction map data 114. Data items 112 and 114 may be received over network 108 from one or more remote systems 106, or they can be received directly, such as through an operator input or otherwise. Soil data 112 can include a wide variety of different types of information about the soil over which mobile machine 102 is traveling. For instance, it can include the soil type, the soil moisture level, or a wide variety of other soil characteristics. Historic compaction map data 114 can represent a historic compaction map that is indicative of a compaction state of the soil based on historic activities or a direct measurement, for example. The map can reflect, for instance, the estimated or measured compaction of the soil, throughout the geographical area of the worksite (e.g. field) given its soil type, given the number of historical passes over the soil by mobile machine 102 or other mobile machines, the location of those passes, etc. This information can be used, as is described in more detail below, by mobile machine 102 in order to identify the effect of additional passes of mobile machine 102 (and other machines) over the soil on the compaction of the soil. This can be used to generate additional information, such as the affect of the soil compaction on the estimated yield of the crop. It can also be used by mobile machine 102 in order to generate control signals to control various aspects of mobile machine 102 in order to, in turn, control the amount of compaction that mobile machine 102 will have on the soil.

In the example shown in FIG. 1, mobile machine 102, itself, illustratively includes one or more processors or servers 116, a plurality of different sensors 118, data store 120, aggregation logic 122, slip estimation logic 124, communication system 126, mapping system 128, yield impact determination system 130, control signal generator 132, one or more controlled systems 134, and it can include a wide variety of other machine functionality 136. Sensors 118 can include position sensor 138, wheel speed sensor 140, tire pressure sensor 142, soil type sensor/indicator 144, vegetation index sensor/indicator 146, crop location sensor/indicator 148, weather sensor/indicator 150, and it can include a wide variety of other machine data sensors or indicators 152 (such as sensors or inputs that indicate the number of axels on machine 102, the weight of machine 102, etc.).

Mapping system 128 can include logic for generating a single soil map, or for generating a soil map for top soil and a soil map for subsoil. In one example, system 128 includes top soil compaction stress mapping logic 154, subsoil compaction stress mapping logic 156, and it can include a wide variety of other items 158. Controlled systems 134 can include path planning system 160, propulsion/steering system 162, tire pressure system 164, alert/user interface (UI) system 166, and it can include a wide variety of other items 168. Before describing the overall operation of mobile machine 102 in more detail, a brief overview of some of the items in mobile machine 102, and their operation, will first be provided.

Position sensor 138 illustratively senses a geographic position of mobile machine 102 and generates a position signal indicative of that position. Sensor 138 can be, for instance, a global positioning system (GPS) receiver, a dead reckoning sensor, a cellular triangulation sensor, or a wide variety of other sensors. Wheel speed sensor 140 illustratively senses the speed of the wheels or tracks that propel mobile machine 102. Tire pressure sensor 142 illustratively senses the tire pressure of tires that support mobile machine 102. Soil type sensor/indicator 144 can be a sensor which senses the soil type of the soil over which mobile machine 102 is traveling. It can also be an input mechanism that allows operator 104 to input the soil type, or that allows mobile machine 102 to receive an indication of the soil type (such as through soil data 112 or otherwise). Vegetation index sensor/indicator 146 can also be a sensor that senses the vegetation coverage on the field (or other worksite) over which mobile machine 102 is traveling, or it can be an input mechanism that receives a representation of the vegetation coverage. For instance, the amount of the field (or worksite) that has vegetation coverage (or the vegetation index) may be derived from, or indicated on, satellite imagery of the field. The satellite imagery may be received automatically, such as from a remote system 106, or it may be input by operator 104, or otherwise.

Crop location sensor/indicator 148 can be a sensor on mobile machine 102 that actively senses a crop location. For instance, some harvesters or other equipment have deflectable fingers that are deflected by the crop, as mobile machine 102 passes over the crop. The deflectable fingers indicate a relative position of the crop, relative to mobile machine 102. There are other crop sensors as well, that can sense a position of the crop in the field, or relative to mobile machine 102, or otherwise. In another example, a kinematic model is used that models constant displacement of various apparatus that travel through the field, like a harvester, seeder, etc. For instance, a GPS receiver location that indicates the location of a GPS receiver on a row unit may allow projection or estimation of crop location based on the GPS receiver location. In another example, sensor/indicator 148 can be a crop location map that was generated when the crop was planted. The map can be input through an interface or input mechanism to mobile machine 102 either automatically (such as downloaded from a remote system 106) or by operator 104, or otherwise.

Weather sensor/indicator 150 illustratively generates a signal indicative of current weather or recent weather in the field (or worksite) where mobile machine 102 is operating. Sensor/indicator 150 can be one or more sensors on mobile machine 102 that actively sense the weather, or an input mechanism that receives that information from a weather site or other remote system 106 either automatically, or based on an input by operator 104.

Other machine data sensors 152 can include a wide variety of different types of sensors. They can be sensors that sense characteristics in the environment around mobile machine 102, or that sense characteristics of the mobile machine 102, itself. They can be settings or configuration inputs that identify the configuration of mobile machine 102, or they can be inputs that indicate other characteristics of mobile machine 102, such as its weight, the number of axels it has, or a wide variety of other information.

Aggregation logic 122 illustratively receives the position signal output by position sensor 138 and aggregates the geographic position of mobile machine 102, indicated by that signal, over time. In doing this, it illustratively generates a map 170 that maps the passes of mobile machine 102 over the field (or worksite) in which it is operating. The map of passes 170 can be in the form of a route map that shows the route of the mobile machine 102, or it can be in the form of another representation of the passes that mobile machine 102 has made over the field in which it is operating.

Slip estimation logic 125 illustratively receives the position signal from position sensor 138 as well as the wheel speed signal from wheel speed sensor 140. By comparing these two signals, slip estimation logic 124 can estimate whether mobile machine 102 is slipping, as it travels over the soil, or whether its traction is relatively constant. The degree of slip may be used as a proxy for surface (top soil) moisture level. Based on the slippage estimated by slip estimation logic 124, logic 124 (or other logic) can illustratively generate a surface/soil moisture metric 172 that is indicative of the surface conditions of the field, or soil moisture conditions of the field over which mobile machine 102 is traveling. For instance, if the field is relatively dry, this may be identified by the fact that slip estimation logic 124 is estimating relatively little slip of mobile machine 102, and hence better traction. However, if the soil is relatively wet (or muddy) then this may be identified by the fact that slip estimation logic 124 is estimating a relatively high degree of slip for mobile machine 102, as it passes over the soil. It will be noted that, in order to generate surface/soil moisture metric 172, slip estimation logic 124 may also receive other information, such as weather information from weather sensor/indicator 150, soil type information from soil type sensor/indicator 144, or information from any other sensors 118 (such as soil conductivity sensors) or other inputs.

Mapping system 128 illustratively generates maps indicating the stress that the soil is under, based upon its compaction. Top soil compaction stress mapping logic 154 illustratively generates a map indicating the top soil stress caused by compaction, while subsoil compaction stress mapping logic 156 illustratively generates a map indicating the stress on the subsoil, based on its compaction. The compaction stress maps illustratively identify areas of high stress (or high compaction) and areas of low stress (or low compaction). They also illustratively indicate the location of the crops and areas that may be more or less sensitive to compaction, such as the plant location, the corresponding root zone, etc.

Yield impact determination system 130 illustratively uses sensor signals from sensors 118 and mapping system 128 (such as the top soil compaction stress map and the subsoil compaction stress map and a historic yield map showing the historic yield for the field over which mobile machine 102 is operating), and determines an impact on the yield based upon the compaction stress in the soil. This is described in greater detail below with respect to FIG. 3.

Also, as described in greater detail below with respect to FIG. 2, control signal generator 132 can identify sensitive areas in the field (or receive this information from another item), where compaction will more likely affect the yield, and generates control signals to mitigate the compaction in those areas, where desirable. For instance, control signal generator 132 may identify (or receive) the plant location and the root zone for the plants, based upon signals from sensors 118. This may be an area of high sensitivity, where additional compaction may significantly affect yield. It may then illustratively generate control signals to control the controlled systems 134 to mitigate compaction in those areas. In doing so, and as further described below, it may implement a cost function which represents the cost of additional compaction in different areas of the field. For instance, the cost function may indicate that it is relatively costly to apply more compaction to a highly sensitive area in the field (e.g., very near the crop location or its root zone), while the cost is relatively low for applying additional compaction outside of those zones (such as between crop rows). The criteria considered in the cost function may include a wide variety of different types of criteria. For instance, it may consider the fact that a tractor pulling more than one wagon will (in combination) apply more compaction than the same tractor pulling a single wagon. However, the cost of having the tractor change wagons more frequently may justify the additional compaction, at some point. The criteria can be identified empirically, they can be identified by a machine learning system, or they can be identified in other ways. Also, applying a cost function is only one way of generating control signals and others may be used as well.

The controlled systems 134 can include a wide variety of different types of controlled systems. For instance, path planning system 160 can be used to plan a path (e.g., a geographic route) of mobile machine 102 through a field (or worksite). The control signals generated by control signal generator 132 can cause path planning system 160 to plan a path which mitigates the affect of additional compaction on the soil in the field.

Propulsion/steering system 162 can be used to control the speed and direction of travel of mobile machine 102. Control signal generator 132 can generate control signals so that the speed and direction of mobile machine 102 conform to the path generated by path planning system 160.

Tire pressure system 164 can be used to sense and control the tire pressure when mobile machine 102 is propelled by ground-engaging tires. Control signal generator 132 can generate control signals to control the tire pressure, such as to lower the tire pressure when mobile machine 102 is traveling over high impact or sensitive areas, and to increase the tire pressure when it is not. This may accomplish multiple goals of increasing fuel efficiency with a higher tire pressure, but decreasing soil compaction with a lower tire pressure.

Alert/UI system 166 can be used to alert the operator 104 to various things, such as when mobile machine 102 is approaching a high sensitivity area, or when mobile machine 102 is encroaching on, or already driving over, a high sensitivity area. It can send such alerts to a remote system 106, and it can generate alerts and instructions indicating that operator 104 should change course, change tire pressure, etc. It can generate a wide variety of other user interfaces as well.

Controlled systems 132 can, themselves, include sensors that generate signals that can be communicated, using communication system 126, to remote systems 106. For example, when an operator is frequently driving over high sensitivity areas, this may be communicated to remote system 106, where a manager or other person can contact the operator to take corrective action. This is just one example.

Communication system 120 can include any of a wide variety of different types of communication systems. Communication system 126 can, for instance, be configured to communicate with remote systems 106 over network 108. It can be a cellular communication system, a satellite communication system, a near field communication system, and/or any of a wide variety of other communication systems. Some of these are described in greater detail below.

Figure 2:
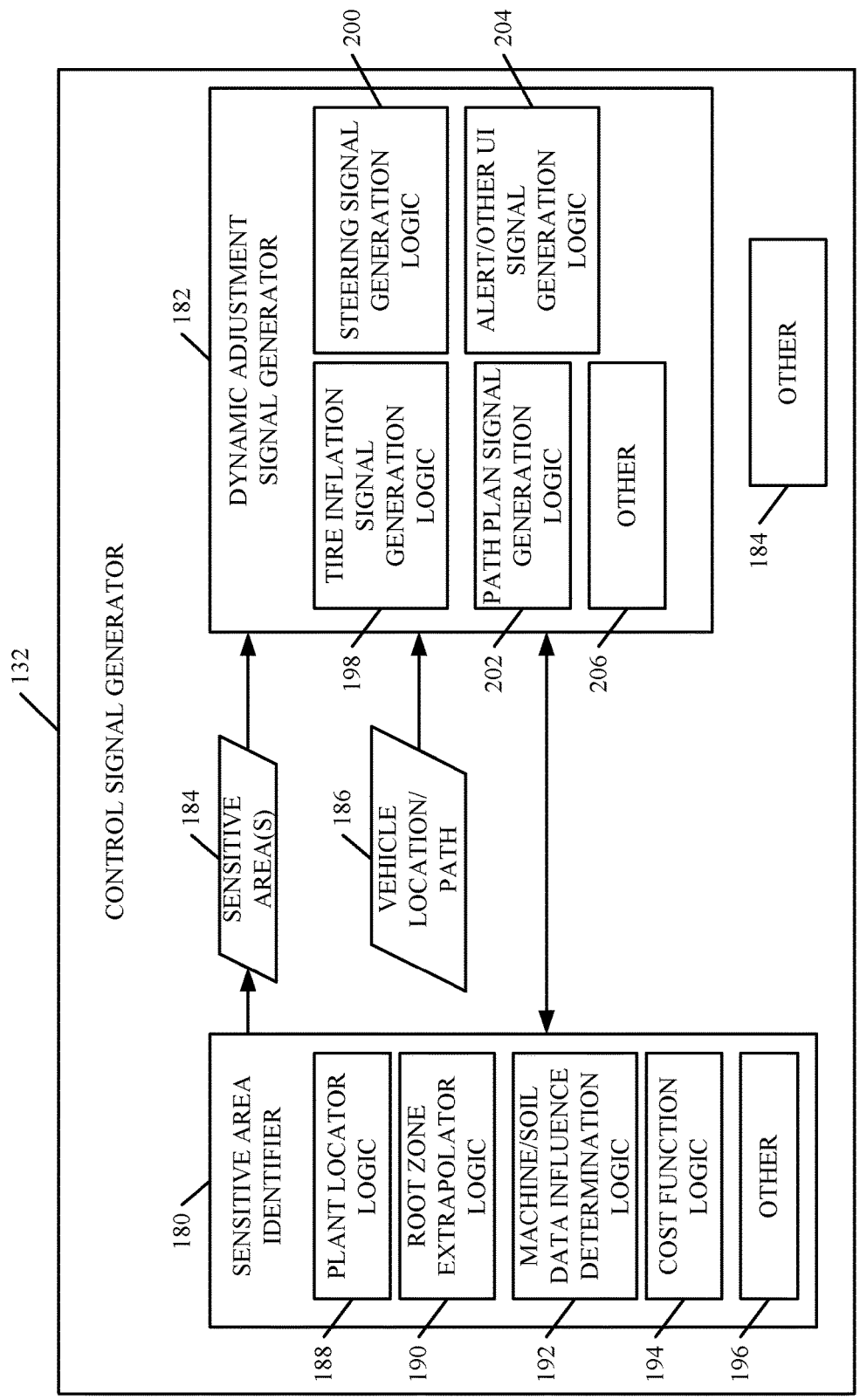
FIG. 2 is a block diagram of one example of a control signal generator.

FIG. 2 is a block diagram showing one example of control signal generator 132, in more detail. In the example shown in FIG. 2, control signal generator 132 illustratively includes sensitive area identifier 180, dynamic adjustment signal generator 182, and it can include a wide variety of other items 184. Sensitive area identifier 180 illustratively generates a representation of sensitive areas 184 that can be provided, along with vehicle location/path indicator 186 to dynamic adjustment signal generator 182. Vehicle location/path indicator 186 can be provided by position sensor 138 (shown in FIG. 1) or by path planning system 160, and illustratively represents a current location and/or path for mobile machine 102. Dynamic adjustment signal generator 182 can then generate control signals to control controlled systems 134 to modify the location and/or path of mobile machine 102 so that it is positioned away from sensitive areas 184 or otherwise mitigates the affect of the additional soil compaction.

Sensitive area identifier 180, in one example, includes plant locator logic 188, root zone extrapolator logic 190, machine/soil data influence determination logic 192, cost function logic 194, and it can include other items 196. Dynamic adjustment signal generator 182 illustratively includes tire inflation signal generation logic 198, steering signal generation logic 200, path plan signal generation logic 202, alert/other UI signal generation logic 204, and it can include other items 206.

Plant locator logic 188 illustratively identifies a location of a plant in the field. This can be generated based on the crop location signal generated by crop location sensor/indicator 148 or derived based on vehicle or apparatus location, as discussed above. Root zone extrapolator logic 190 then extrapolates a root growth function to identify a root zone surrounding the location of the plant. For instance, in a field with a ratoon crop (such as a sugarcane field) when the sugarcane is cut, the root grows wider at a rate that can be estimated based on weather conditions, soil type, nutrients applied, etc. Thus, root zone extrapolator logic 190 may determine the number of times that the sugarcane plant was cut, and how recently it has been cut, and extrapolate a root growth function to identify an estimate of the root zone surrounding the plant. The plant location and the root zone may be combined to identify the sensitive area 184 with respect to the given plant, or crop.

Machine/soil data influence determination logic 192 illustratively uses machine data and soil data (which can be generated by any of the sensors 118 or by the soil data 112 received by mobile machine 102) to determine the influence on soil compaction that the machine will have. This will be influenced by not only the type of soil and the soil conditions, but also by the machine parameters or data. For instance, if the machine is relatively heavy and has a relatively small number of axels with relatively high tire pressure, or relatively thin steel tracks, then the impact of the machine traveling over a sensitive area will be at a first level. However, if the machine is lighter, with more axels, and lower tire pressure (e.g., it has a larger tire foot print), or with relatively wide rubber tracks, then the impact of the machine traveling over a sensitive area will be relatively lower.

Cost function logic 194 illustratively applies a cost function that generates a value indicative of a cost of the machine traveling over different areas of the field. For instance, the value generated by the cost function may illustratively drop, as the machine travels further and further from the plant location, and root zone (e.g., as it travels further from the sensitive areas 184).

Based upon this information, alert/other UI signal generation logic 204 can generate control signals to control alert/UI system 166 (shown in FIG. 1) to alert operator 104 to control mobile machine 102 so as to avoid additional compaction in the sensitive areas 184. Tire inflation signal generation logic 198 can generate control signals to control tire pressure system 164 (shown in FIG. 1) to reduce tire pressure when mobile machine 102 is traveling over a sensitive area 184, and to increase tire pressure when it is not, based upon the cost function value output by cost function logic 194. Steering signal generation logic 200 can generate control signals to control propulsion/steering system 162 to avoid additional compaction in sensitive areas 184. Path plan signal generation logic 202 can generate control signals to control path planning system 160 to plan a path where additional compaction is also avoided, in sensitive areas 184. In another example, controlled traffic farming can be performed. In this scenario, a designated traffic area (or sacrifice area) is identified and the equipment is controlled to stay on this area. This can result in high compaction, but overall lower compaction across the field.

Figure 3:
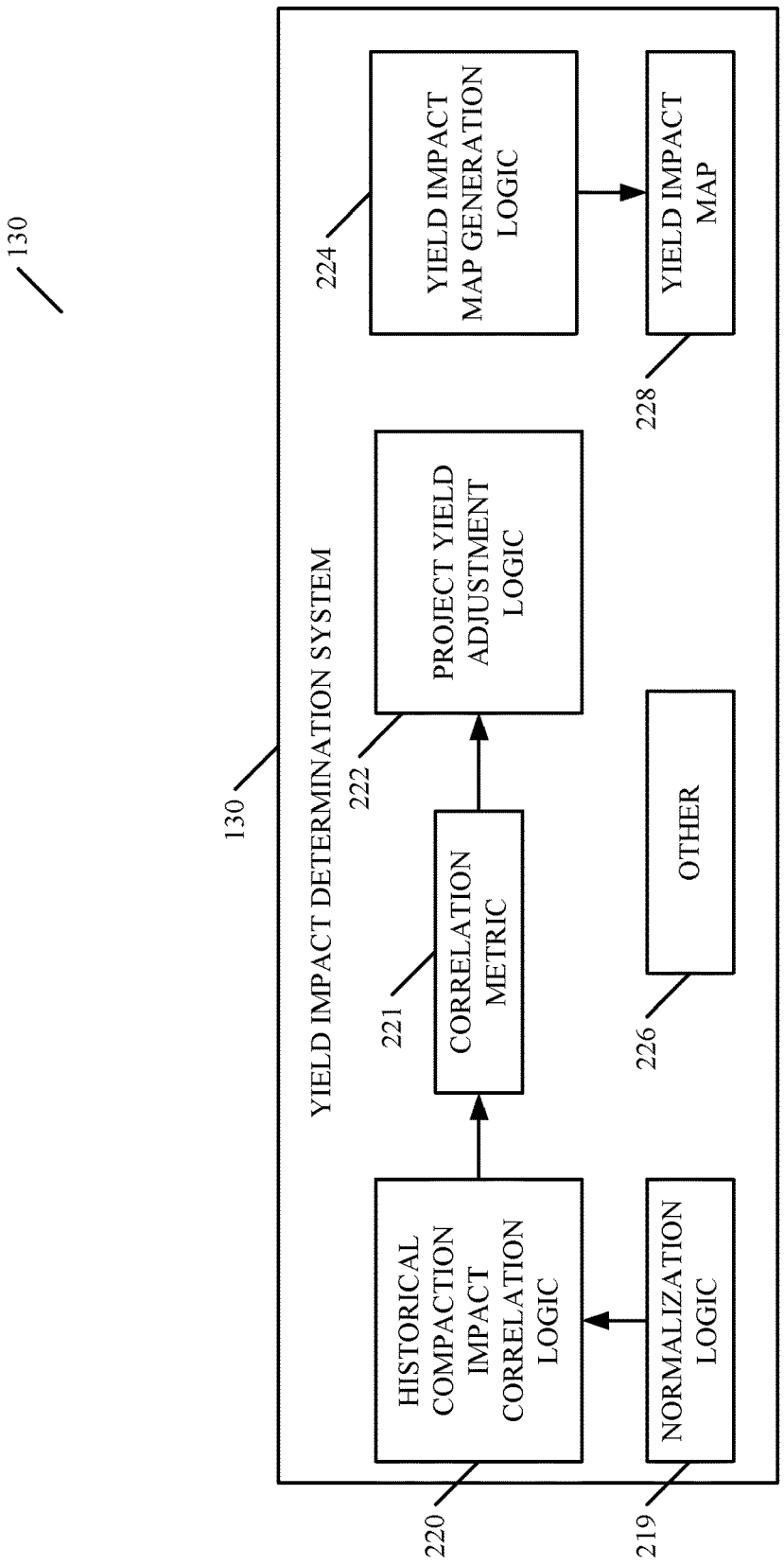
FIG. 3 is a block diagram of one example of a yield impact determination system.

FIG. 3 is a more detailed block diagram showing one example of yield impact determination system 130. In the example shown in FIG. 3, system 130 illustratively includes normalization logic 219, historical compaction impact correlation logic 220, projected yield adjustment logic 222, yield impact map generation logic 224, and it can include other items 226. Normalization logic 219 reduces the impact of year-to-year differences on correlation metric 221. For instance, it can use expectancy and sigma environments to normalize historic versus predicted yield based on a statistical distribution of yield over past years. In another example, logic 219 can identify "zones of like" based on agronomic and terrain parameters (e.g., soil, access to water, soil type, etc.) and consider average yield as a neutralization parameter. Historical compaction impact correlation logic 220 illustratively identifies the historic impact that soil compaction has had on yield and generates a correlation metric 221 that correlates compaction impact in certain areas relative to a crop, with the yield for that crop. This correlation metric 221 can be generated based upon an historic compaction map data 114 (shown in FIG. 1) and historic yield information that may be received by logic 220. By comparing the historic yield values with the historic compaction map, the correlation metric 221 can be identified.

Projected yield adjustment logic 222 can receive or generate a projected yield map for the field indicative of a projected yield from various geographic areas of the field. It can then adjust the projected yield based upon the correlation metric 221 generated by logic 220, and based upon the top soil and subsoil compaction stress maps generated by top soil compaction stress mapping logic 154 and subsoil compaction stress mapping logic 156 (shown in FIG. 1), respectively. Yield impact map generation logic 224 then illustratively generates a yield impact map 228 showing the impact on the yield for the current field, based upon the soil compaction that already exists, and/or that is projected based upon further operations in the field. The yield impact map 228 can be used by operator 104, or a manager at a remote system 106, or otherwise, to modify operations in order to reduce the impact of soil compaction on the yield.

It will be noted that this information can be generated for each field, for each operator or otherwise. Corrective action can be identified for individual operators, for individual fields or for combinations of these and other aggregation criteria.

Figure 4A:
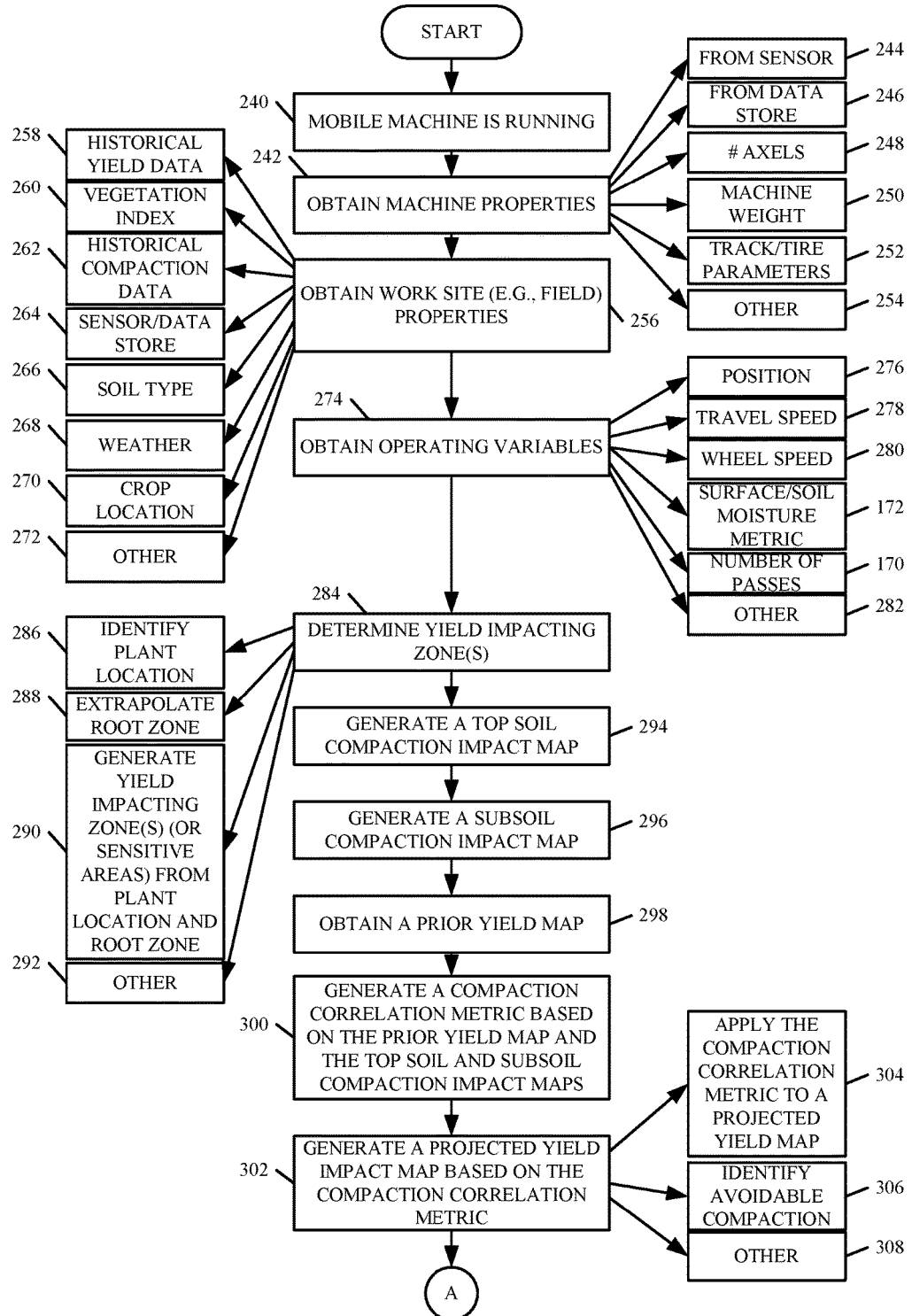
FIGS. 4A and 4B (collectively referred to herein as FIG. 4) illustrate a flow diagram showing one example of the operation of the architecture illustrated in FIG. 1 in measuring soil compaction and generating control signals based upon the measured compaction.
Figure 4B:
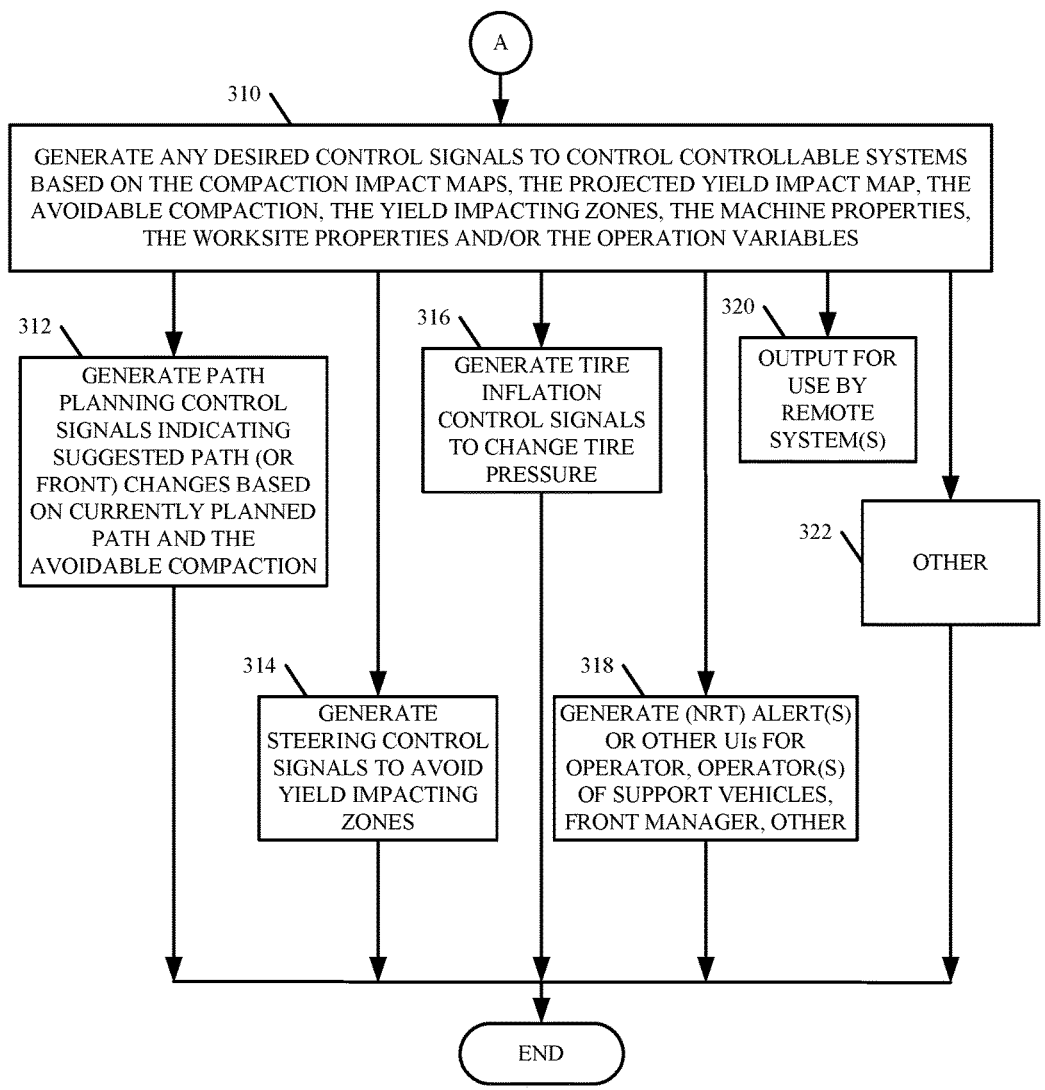

FIGS. 4A and 4B (collectively referred to herein as FIG. 4), illustrate a flow diagram showing the operation of machine architecture 100 (including control signal generator 132 and yield impact determination system 130), in generating control signals to control various items, based upon the various soil impact metrics and characteristics that are sensed or generated. It is first assumed that mobile machine 102 is running and is traveling over a field (it could be any worksite, but in the present example it is an agricultural field). This is indicated by block 240 in the flow diagram of FIG. 4. At some point, mapping system 128, yield impact determination system 130 and/or control signal generator 132 illustratively obtain machine properties or characteristics relative to machine 102. This is indicated by block 242. They can be obtained from sensors 118, as indicated by block 244. They can be obtained from a data store (such as data store 120 that stores those properties) or from user inputs or other inputs. This is indicated by block 246. The machine properties can include a wide variety of different properties such as the number of axels 248, the machine weight 250, track/tire parameters (such as track width or tire inflation pressure, etc.) 252, or a wide variety of other machine properties 254.

Systems 128 and 130 and generator 132 also then illustratively obtain worksite (e.g., field) properties. This is indicated by block 256. Such properties can again include a wide variety of information. The properties can include historical yield data 258, a vegetation index 260, and historical compaction data 262. They can be obtained from sensors 118 or a data store as indicated by block 264. They can include soil type 266, weather information 268, crop location 270, and a wide variety of other information 272.

Mapping system 128, yield impact determination system 130, and/or control signal generator 132 then illustratively obtain operating variables. This is indicated by block 274 in the flow diagram of FIG. 4. The operating variables can be obtained directly, or derived from sensor data or other information. The operating variables can include position 276 indicating the position of mobile machine 102. They can include travel speed 278 and wheel speed 280 that indicate the travel speed of mobile machine 102 (such as derived from GPS data) and the wheel speed such as from wheel speed sensor 140, respectively. They can include the surface/soil moisture metric 172 (described above with respect to FIG. 1), and the map or number of passes 170 (also described above with respect to FIG. 1). The operating variables can include a wide variety of other variables 282, as well.

Also, at some point, sensitive area identifier 180 generates the sensitive area representation 184 that represents areas in the field that will be sensitive to additional soil compaction, with respect to yield. Determination of these types of yield impacting zones in the field is indicated by block 284 in the flow diagram of FIG. 4. As discussed above with respect to FIG. 2, this can be done by identifying the plant location as indicated by block 286, and extrapolating the root zone as indicated by block 288, and then identifying the yield impacting zones (or sensitive areas) from that information, as indicated by block 290. The yield impacting zones can be determined in a wide variety of other ways as well, and this is indicated by block 292.

Mapping system 120, and in particular top soil compaction stress mapping logic 154 then generates a top soil compaction impact map (or stress map). This is indicated by block 294 in the flow diagram of FIG. 4. As discussed above, the top soil compaction impact map (or stress map) can indicate the stress on different geographic areas of the field, due to soil compaction. This can be based on historical soil compaction, based on estimated future soil compaction, or both.

Similarly, subsoil compaction stress mapping logic 156 illustratively generates a subsoil compaction impact map (or stress map). This is indicated by block 296. The subsoil compaction impact map (or stress map) can indicate the same thing as top soil compaction impact map (or stress map) but with respect to the subsoil of the field as opposed to the top soil. It can indicate other things as well.

Historical compaction impact correlation logic 220 (shown in FIG. 3) then accesses a prior yield map for the field. This is indicated by block 298 in the flow diagram of FIG. 4. The prior yield map may identify the yield from the field for one or more previous harvest seasons. The historical compaction correlation logic 220 then generates the correlation metric 221 that indicates a correlation between soil compaction at the sensitive areas 184, and crop yield. For instance, it identifies a change in crop yield based on a change in soil compaction in the field, in the sensitive areas, and generates correlation metric 221 based upon that comparison. The comparison can be made based upon the prior yield map and the top soil and subsoil compaction impact maps. Generating the correlation metric 221 is indicated by block 300 in the flow diagram of FIG. 4. The metric can be influenced by any normalization value(s) generated by normalization logic 219 as well.

Projected yield adjustment logic 222 then generates a projected yield impact map based on the compaction correlation metric 221. This is indicated by block 302. For instance, it can apply the compaction correlation metric 221 to a projected yield map for the field to adjust the projected yield map, based upon the compaction correlation metric 221. By way of example, it may be that the projected yield map projects a yield for the field but does not consider the affect of additional soil compaction on the yield. Projected yield adjustment logic 222 can apply the correlation metric 221 to adjust the projected yield values for the field, based upon additional soil compaction that has occurred, or that is estimated to occur in the field. Applying the compaction correlation metric 221 to the projected field map is indicated by block 304.

Yield impact map generation logic 224 can then generate a map that shows various items. For instance, it can show avoidable compaction areas where, if future operations are adjusted, such as to change the path of vehicles, change the types of vehicles or characteristics of the vehicles (e.g., vehicles with more axels, lower tire pressure, etc.), additional compaction can be avoided, at least to some extent. Identifying avoidable compaction is indicated by block 306. The projected yield impact map generation logic 224 can generate the yield impact map 228 to show a wide variety of other items as well, and this is indicated by block 308.

Control signal generator 132 then generates any desired control signals to control the controllable systems (or controlled systems) 134 based upon the compaction impact maps, the projected yield impact map, the avoidable compaction areas, the yield impacting zones (or sensitive areas 184), the machine properties, the worksite properties and/or the operating variables. This is indicated by block 310 in the flow diagram of FIG. 4.

This can take a wide variety of different forms. For instance, path plan signal generation logic 202 (shown in FIG. 2) can generate path planning control signals indicating a suggested path (or front) change based on a currently planned path and the avoidable compaction identified by the yield impact map 228. Generating the path planning control signals to change the suggested path is indicated by block 312 in the flow diagram of FIG. 4. Steering signal generation logic 200 can generate steering control signals to avoid the yield impacting zones (or sensitive areas 184) automatically, as mobile machine 102 travels through the field. This is indicated by block 314 in the flow diagram of FIG. 4. Tire inflation signal generation logic 198 can generate tire inflation control signals to change tire pressure, based upon the particular location of mobile machine 102 relative to the yield impacting zones, or sensitive areas 184, and based upon the avoidable compaction areas identified by yield impact map 128. This is indicated by block 316 in the flow diagram of FIG. 4.

Alert/other UI signal generation logic 204 can generate near real time alerts or other user interfaces for operator 104, for operators of support vehicles, for a front manager, or for other people or systems. This is indicated by block 318.

The control signals can be generated for use by remote systems 106. Therefore, for instance, an alert control signal may be generated and communicated using communication system 126 to a remote system 106 to alert a user at the remote system 106 that an operator 104 is frequently driving over sensitive areas 184, or to alert them of a wide variety of other things. This is only one example of how control signals can be generated and communicated to remote systems 106. This is indicated by block 320 in the flow diagram of FIG. 4.

Control signal generator 132 can generate a wide variety of other control signals as well. This is indicated by block 322 in the flow diagram of FIG. 4.

Figure 5:
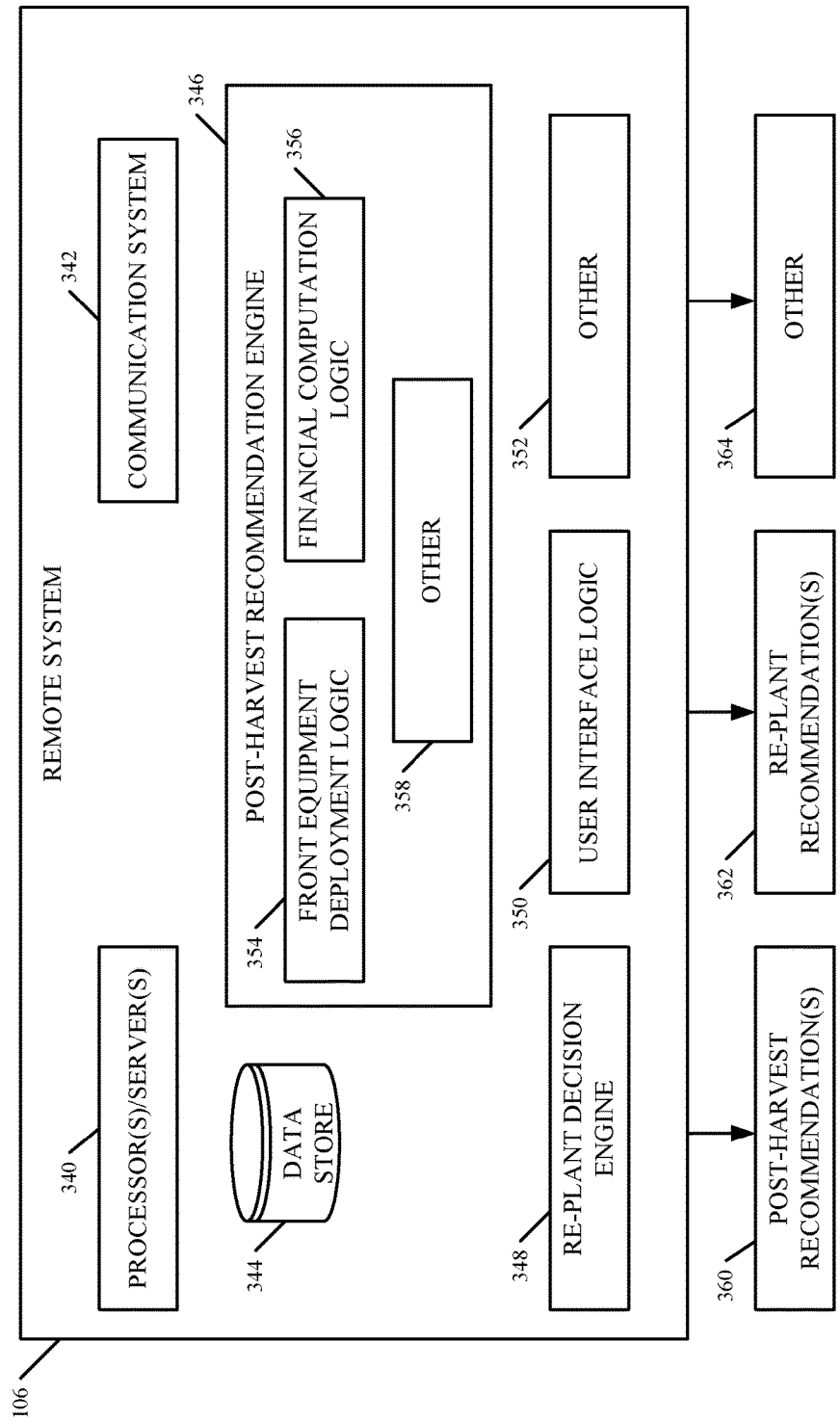
FIG. 5 is a block diagram showing one example of a remote system.

FIG. 5 is a more detailed block diagram showing one example of a remote system 106. It will be appreciated that a wide variety of other remote systems can be used as well, and that shown in FIG. 5 is shown for the sake of example only. In the example shown in FIG. 5, remote system 106 illustratively includes one or more processors or servers 340, communication system 342, data store 344, post-harvest recommendation engine 346, re-plant decision engine 348, user interface logic 350, and it can include a wide variety of other items 352. Communication system 342 can be similar to communication system 126, or different. In one example, it is configured to communicate over network 108 with mobile machine 102. Thus, it can receive the control signals, map of passes 170, surface/soil moisture metric 172, the various soil compaction stress maps, yield maps, etc. generated by mobile machine 102.

Post-harvest recommendation engine 346 can include front equipment deployment logic 354, financial computation logic 356, and it can include a wide variety of other items 358. Front equipment deployment logic 354 can be used to generate post-harvest recommendations 360 that indicate how equipment might be differently deployed on the various fronts during harvesting, in order to reduce the impact of soil compaction on yield. This may include, for instance, changing the path of the harvester or support machines, changing the types of machines or characteristics of machines, changing the configuration of the machines (such as by reducing the number of wagons pulled by a given tractor, changing the tire pressure, etc.).

Financial computation logic 356 can estimate a financial value corresponding to changes in yield, due to soil compaction. For instance, it can generate a value indicative of an estimated increase in cost, due to yield loss, for a particular front configuration. It can also generate that same metric for a different front configuration, so that a user can quantify the changes in yield, for the two different front configurations. The user can thus make better decisions as to how to deploy equipment on a given front, in order to achieve additional efficiencies.

Re-plant decision engine 348 illustratively generates re-plant recommendations 362 that may be indicative of when a crop should be re-planted. For instance, subsoil compaction (e.g., compaction in the soil at a depth in excess of 60 cm) in a sugarcane field may accumulate over different years. The subsoil compaction simply continues to increase in an aggregated way, from year to year unless it is alleviated by frost or otherwise. This may affect root growth, and it may also affect the amount of moisture and nutrients getting to the roots, which can affect yield. Similarly, the top soil compaction stress may also accumulate over a given season, or multiple seasons, to effect yield as well. Re-plant decision engine 348 thus considers soil compaction as one factor in generating re-plant recommendations 362. Other inputs may include a current year after planting, expected years of harvest (given a crop variety, for example), the cost of re-planting, the cost of yield loss over the remaining years before re-planting, among others. It may, for example, balance the cost of a reduction in yield due to soil compaction over a number of years (and possibly other factors) against the cost of re-planting. It will be appreciated that remote system 106 can generate a wide variety of other outputs 364 as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the information on map 107 can be output to the cloud.

Figure 6:
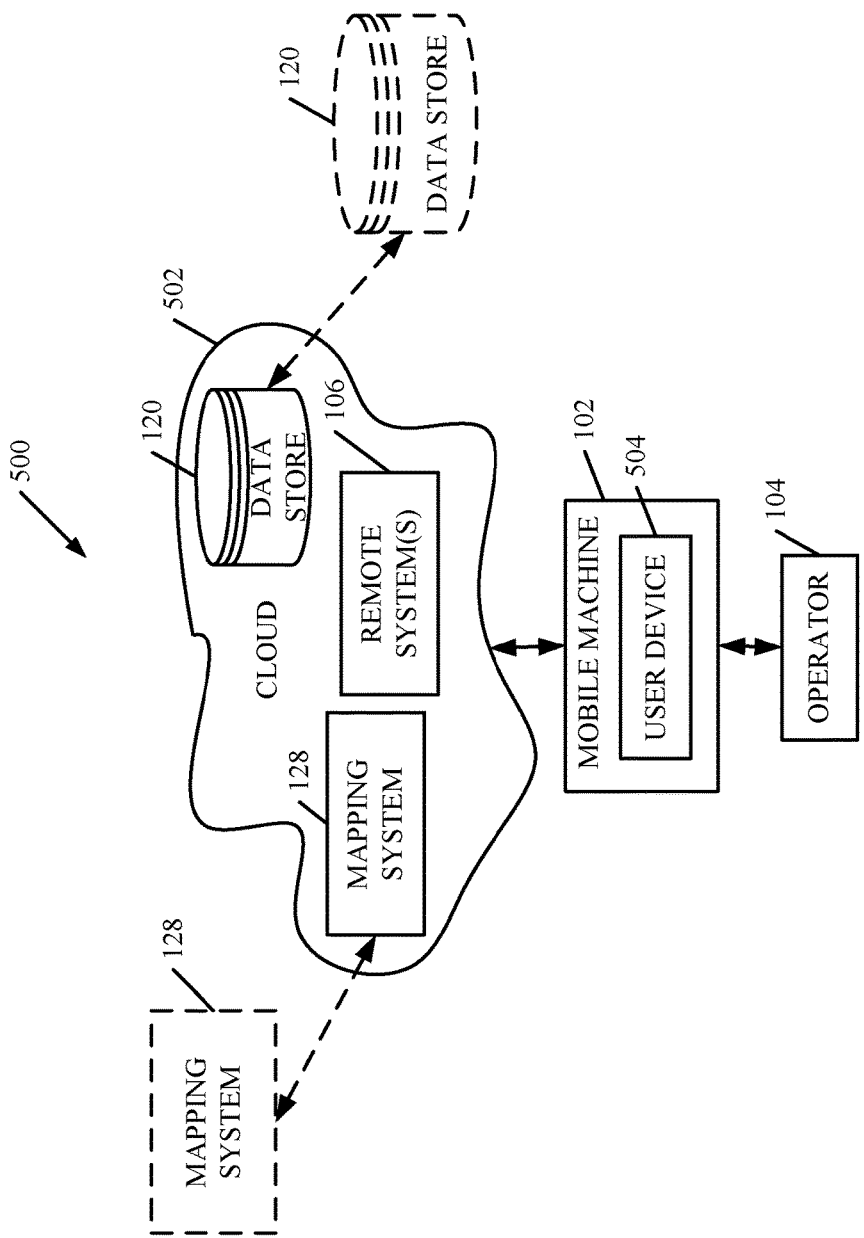
FIG. 6 is a block diagram showing the mobile machine architecture illustrated in FIG. 1, deployed in a remote server environment.

FIG. 6 is a block diagram of mobile machine 102, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 6, some items are similar to those shown in FIG. 1 and they are similarly numbered. FIG. 6 specifically shows that remote systems 106 can be located at a remote server location 502. Therefore, mobile machine 102 accesses those systems through remote server location 502.

FIG. 6 also depicts another example of a remote server architecture. FIG. 6 shows that it is also contemplated that some elements of FIG. 1 are disposed at remote server location 502 while others are not. By way of example, data store 120 or mapping system 128 can be disposed at remote server location 502 or at a location separate from location 502, and accessed through the remote server at location 502. Regardless of where they are located, they can be accessed directly by mobile machine 102, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As machine 102 comes close to the fuel truck for fueling, the system automatically collects the information from the machine 102 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine 102 until the machine 102 enters a covered location. The machine 102, itself, can then send the information to the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
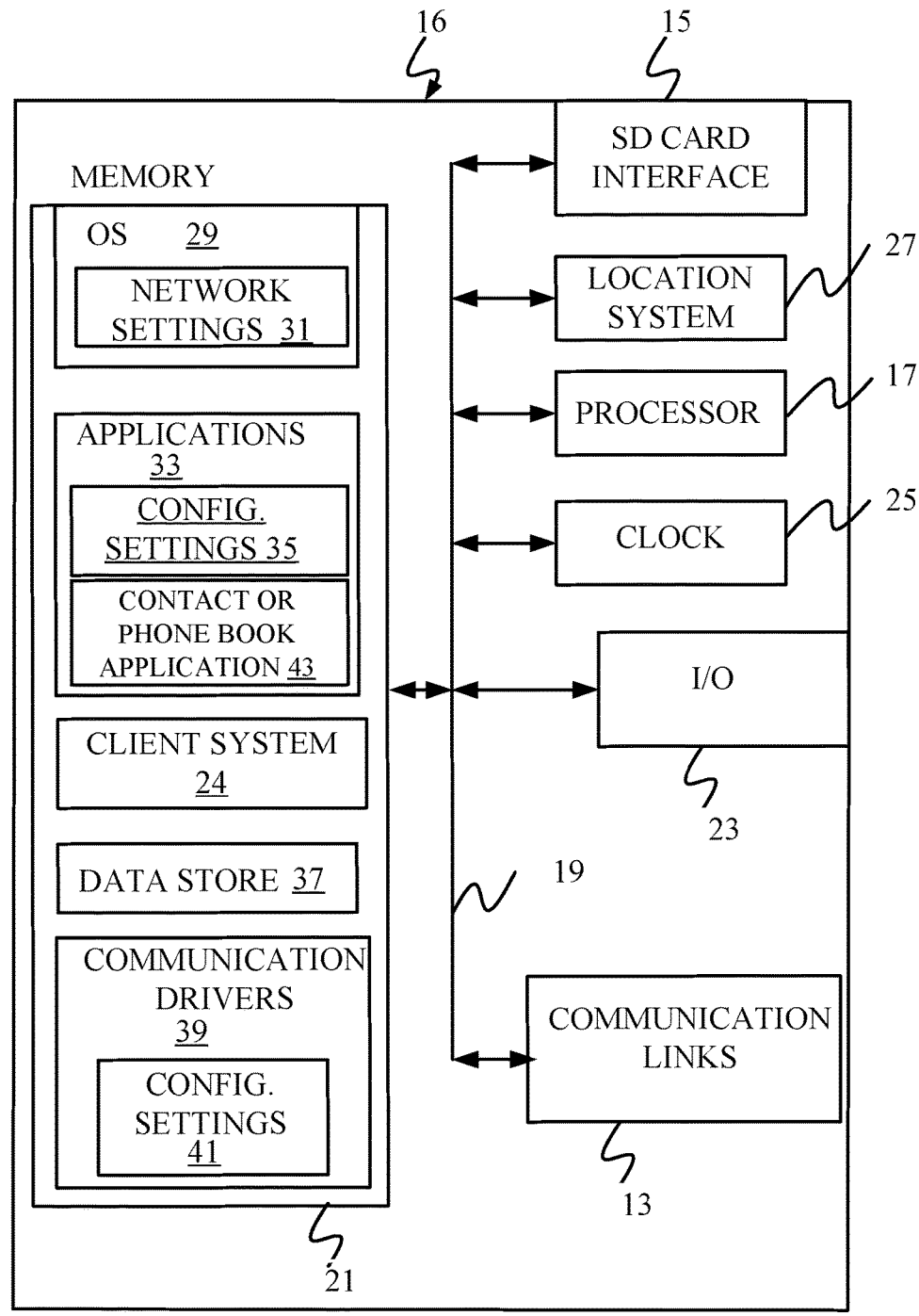
FIGS. 7-9 show examples of mobile devices that can be used in the architectures shown in the previous figures.
Figure 8:
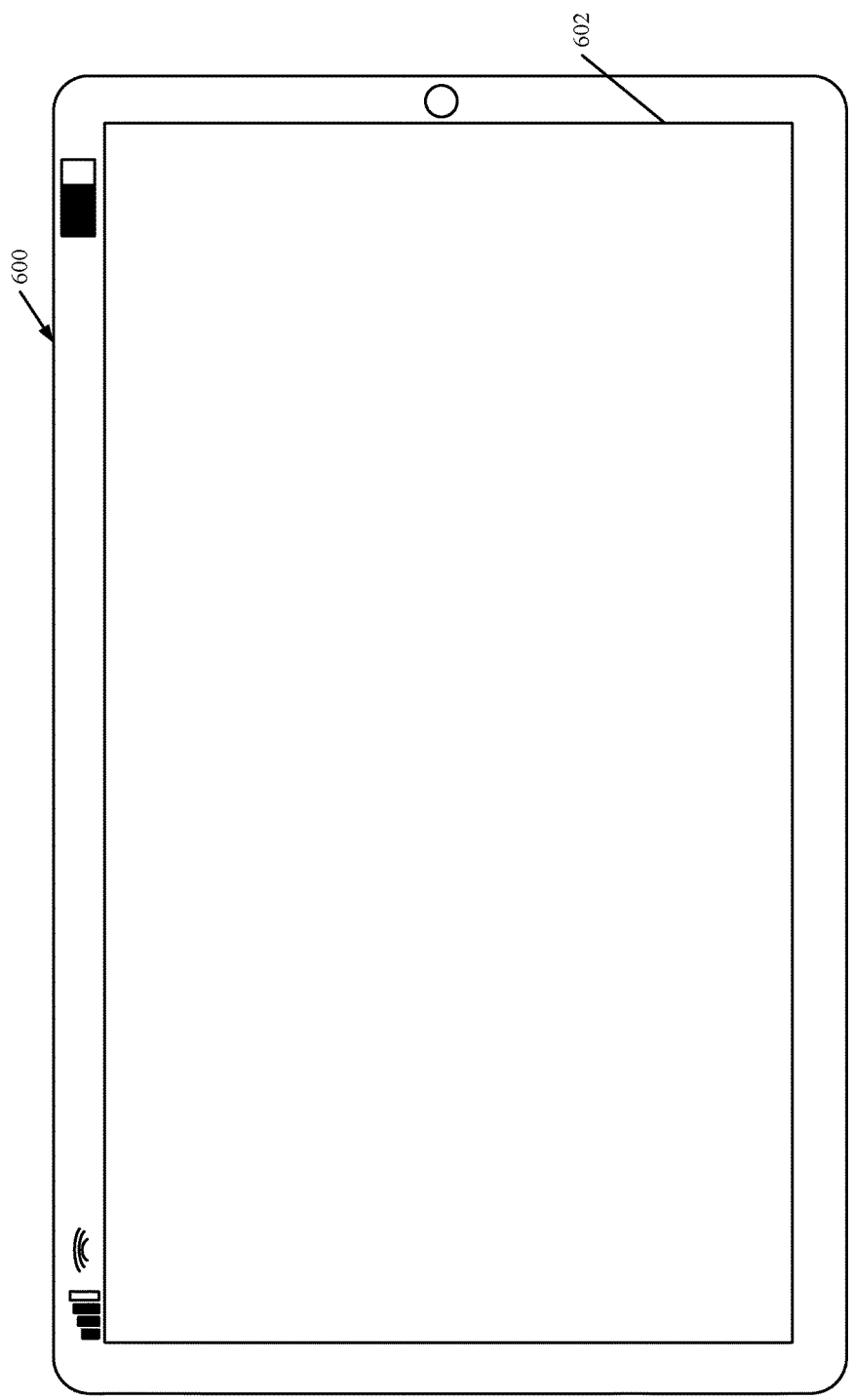
Figure 9:
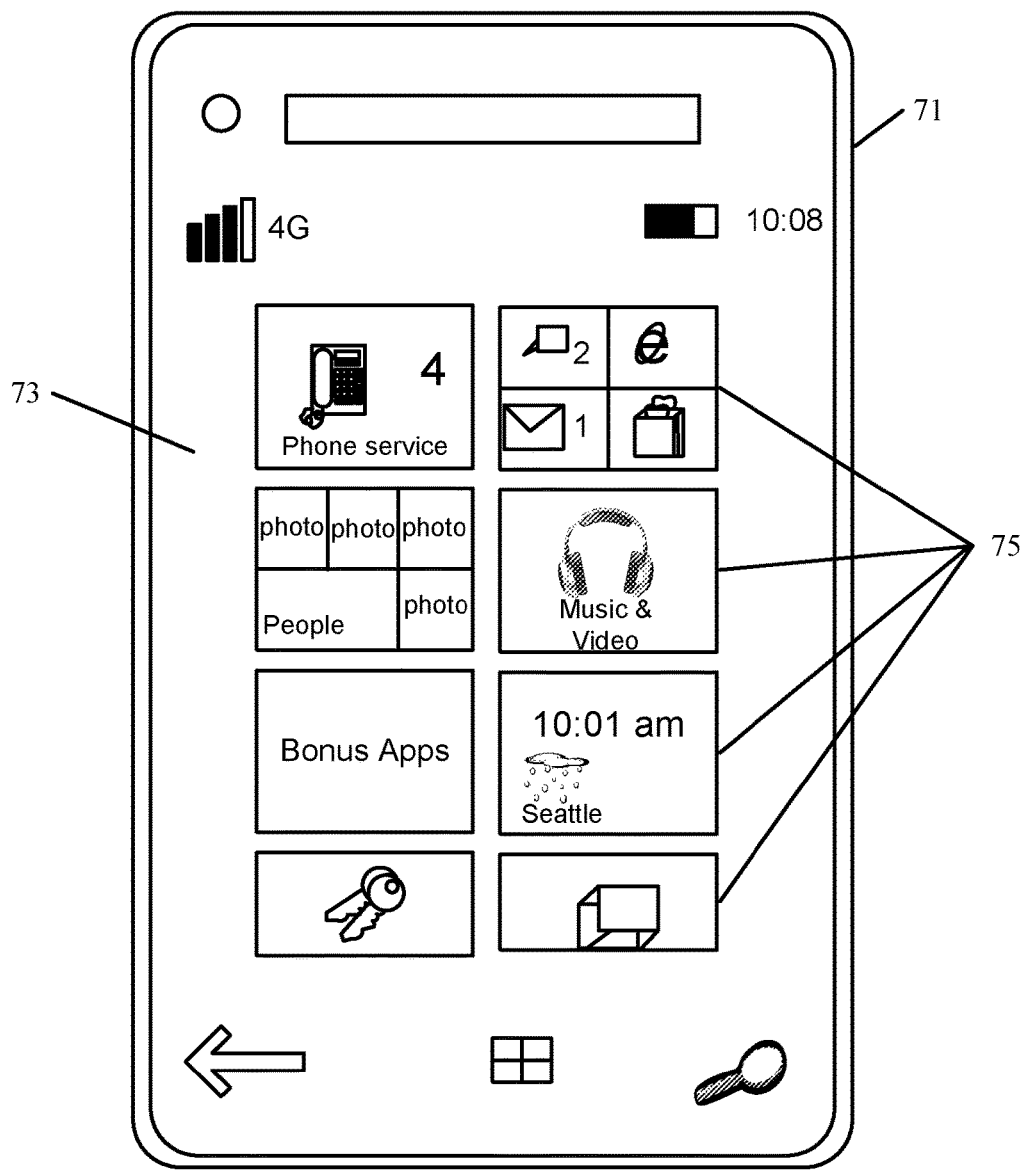

FIG. 7 is a simplified block diagram of one illustrative example of a handheld or mobile computing device that can be used as a user's or client's hand held device 16, in which the present system (or parts of it) can be deployed. For instance, a mobile device can be deployed in the operator compartment of mobile machine 102 for use in generating, processing, or displaying the various data and/or alerts, etc. FIGS. 8-9 are examples of handheld or mobile devices.

FIG. 7 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers 116 or 340 from previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 8 shows one example in which device 16 is a tablet computer 600. In FIG. 8, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
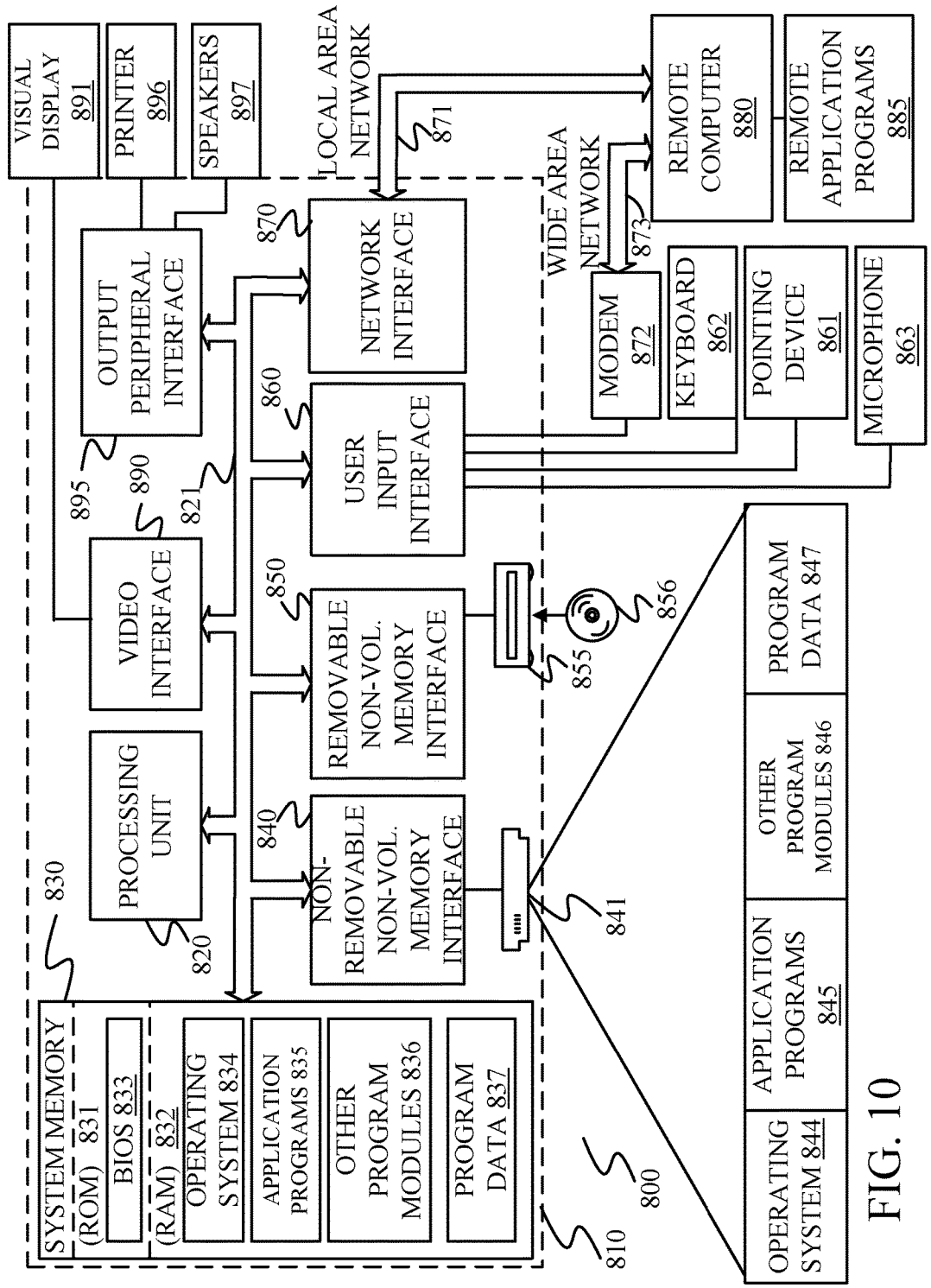
FIG. 10 is a block diagram showing one example of a computing environment that can be used in the architectures shown in the previous figures.

FIG. 10 is one example of a computing environment in which elements of FIG. 1, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processors or servers 116 or 340), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a mobile machine that travels over a worksite, the mobile machine comprising:

a mapping system that generates a compaction stress map indicative of a soil compaction of soil across the worksite;

a worksite impact determination system that identifies, as a compaction impact, an impact of the soil compaction at the worksite, on a characteristic of the worksite, based on the compaction stress map; and a control signal generator that generates a control signal to control a controlled system, in near real time, based on the compaction impact.

Example 2 is the mobile machine of any or all previous examples and further comprising:

a sensitive area identifier that identifies, as sensitive areas of the worksite, areas where the characteristic of the worksite is relatively more sensitive to soil compaction, than at other areas of the worksite.

Example 3 is the mobile machine of any or all previous examples and further comprising:

a position sensor configured to sense a geographic vehicle position and generate a vehicle position signal indicative of the geographic vehicle position.

Example 4 is the mobile machine of any or all previous examples wherein the control signal generator comprises:

a dynamic adjustment signal generator configured to generate the control signal based on the sensitive areas of the worksite and based on the geographic vehicle position.

Example 5 is the mobile machine of any or all previous examples wherein the mobile machine includes a steering system that steers the mobile machine and wherein the dynamic adjustment signal generator comprises:

steering signal generation logic configured to generate a steering control signal to control the steering system to steer the mobile machine to avoid additional soil compaction in the sensitive areas.

Example 6 is the mobile machine of any or all previous examples wherein the mobile machine includes a path planning system that generates a geographic route for the mobile machine through the worksite and wherein the dynamic adjustment signal generator comprises:

path plan signal generation logic configured to generate a path control signal to control the path planning system to generate the geographic route for the mobile machine to avoid additional soil compaction in the sensitive areas.

Example 7 is the mobile machine of any or all previous examples wherein the mobile machine includes a tire pressure system that controls a tire pressure of tires on the mobile machine and wherein the dynamic adjustment signal generator comprises:

tire inflation signal generation logic configured to generate a tire pressure control signal to control the tire pressure system to control the tire pressure of the tires on the mobile machine to avoid additional soil compaction in the sensitive areas.

Example 8 is the mobile machine of any or all previous examples wherein the mobile machine includes an alert/user interface (UI) system that controls a user interface to generate an interface on the mobile machine and wherein the dynamic adjustment signal generator comprises:

alert/UI signal generation logic configured to generate an alert/UI control signal to control the alert/UI system to generate the interface on the mobile machine indicative of an operator action to avoid additional soil compaction in the sensitive areas.

Example 9 is the mobile machine of any or all previous examples wherein the worksite comprises an agricultural field that grows a crop and wherein the sensitive area identifier comprises:

plant locator logic that senses plant location and generates a plant location signal indicative of the plant location; and root zone extrapolator logic that generates an estimated root zone based on the plant location signal.

Example 10 is the mobile machine of any or all previous examples wherein the worksite comprises an agricultural field that grows a crop and wherein the worksite impact determination system comprises:

a yield impact determination system that identifies an impact of the soil compaction on a yield of the crop.

Example 11 is the mobile machine of any or all previous examples wherein the yield impact determination system comprises:

compaction impact correlation logic that generates a correlation metric indicative of a correlation between the soil compaction and the yield of the crop; and projected yield adjustment logic that adjusts a projected yield for the crop based on the correlation metric and the compaction stress map.

Example 12 is the mobile machine of any or all previous examples wherein the mapping system comprises:

top soil compaction stress mapping logic that generates a compaction stress map for a top soil of the worksite; and subsoil compaction stress mapping logic that generates a compaction stress map for a subsoil of the worksite.

Example 13 is the mobile machine of any or all previous examples and further comprising:

slip estimation logic that detects wheel slip and generates a soil surface/moisture metric indicative of a characteristic of a surface of the soil over which the mobile machine is traveling based on the detected wheel slip, the mapping system generating the compaction stress map based on the soil surface/moisture metric.

Example 14 is a method of controlling a mobile machine that travels over a worksite, the method comprising:

accessing a compaction stress map indicative of a soil compaction of soil across the worksite;

identifying, as a compaction impact, an impact of the soil compaction at the worksite, on a characteristic of the worksite, based on the compaction stress map; and generating a control signal to control a controlled system on the mobile machine, in near real time, based on the compaction impact.

Example 15 is the method of any or all previous examples and further comprising:

identifying, as sensitive areas of the worksite, areas where the characteristic of the worksite is relatively more sensitive to soil compaction, than at other areas of the worksite.

Example 16 is the method of any or all previous examples and further comprising:

sensing a geographic vehicle position of the mobile machine;

generating a vehicle position signal indicative of the geographic vehicle position; and wherein generating a control signal includes generating the control signal based on the sensitive areas of the worksite and based on the geographic vehicle position.

Example 17 is the method of any or all previous examples wherein the mobile machine includes a steering system that steers the mobile machine, a path planning system that generates a geographic route for the mobile machine through the worksite, a tire pressure system that controls a tire pressure of tires on the mobile machine, and an alert/user interface (UI) system that controls a user interface to generate an interface on the mobile machine and wherein generating the control signal comprises one or more of:

generating a steering control signal to control the steering system to steer the mobile machine to avoid additional soil compaction in the sensitive areas;

generating a path control signal to control the path planning system to generate the geographic route for the mobile machine to avoid additional soil compaction in the sensitive areas;

generating a tire pressure control signal to control the tire pressure system to control the tire pressure of the tires on the mobile machine to avoid additional soil compaction in the sensitive areas; or generating an alert/UI control signal to control the alert/UI system to generate the interface on the mobile machine indicative of an operator action to avoid additional soil compaction in the sensitive areas.

Example 18 is the method of any or all previous examples wherein the worksite comprises an agricultural field that grows a crop and wherein identifying the sensitive areas comprises:

generating a plant location signal indicative of plant location of plants in the crop; and generating an estimated root zone based on the plant location signal.

Example 19 is the method of any or all previous examples wherein the worksite comprises an agricultural field that grows a crop and wherein identifying an impact of soil compaction at the worksite comprises:

identifying an impact of the soil compaction on a yield of the crop.

Example 20 is a mobile machine that travels over a worksite, the mobile machine comprising:

a mapping system that generates a compaction stress map indicative of a soil compaction of soil across the worksite;

a sensitive area identifier that identifies, as sensitive areas of the worksite, areas where the characteristic of the worksite is relatively more sensitive to soil compaction, than at other areas of the worksite;

a position sensor configured to sense a geographic vehicle position and generate a vehicle position signal indicative of the geographic vehicle position;

a worksite impact determination system that identifies, as a compaction impact, an impact of the soil compaction at the worksite, on a characteristic of the worksite, based on the compaction stress map, and the sensitive areas; and a control signal generator that generates a control signal to control a controlled system, in near real time, based on the compaction impact and the geographic vehicle position.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A mobile machine that travels over an agricultural field that grows a crop, the mobile machine comprising:
   a mapping system configured to generate a compaction stress map indicative of a soil compaction of soil across the agricultural field;
   a yield impact determination system configure to identify, as a compaction impact, an impact of the soil compaction at the agricultural field, on a crop yield of the crop in the agricultural field, based on the compaction stress map;
   a sensitive area identifier configured to identify, as sensitive areas of the agricultural field, root zones that include crop roots for the crop;
   a position sensor configured to sense a geographic vehicle position of the mobile machine and generate a vehicle position signal indicative of the geographic vehicle position;
   a control signal generator generating a control signal to control a controlled system on the mobile machine, in near real time, based on the impact on crop yield in the compaction stress map, the geographic vehicle position, and the root zones.

2. The mobile machine of claim 1 wherein the mobile machine includes a steering system that steers the mobile machine and wherein the control signal generator comprises:
   steering signal generation logic configured to generate a steering control signal to control the steering system to steer the mobile machine to avoid additional soil compaction in the root zones.

3. The mobile machine of claim 1 wherein the mobile machine includes a path planning system that generates a geographic route for the mobile machine through the agricultural field and wherein the control signal generator comprises:
   path plan signal generation logic configured to generate a path control signal to control the path planning system to generate the geographic route for the mobile machine to avoid additional soil compaction in the root zones.

4. The mobile machine of claim 1 wherein the mobile machine includes a tire pressure system that controls a tire pressure of tires on the mobile machine and wherein the control signal generator comprises:
   tire inflation signal generation logic configured to generate a tire pressure control signal to control the tire pressure system to control the tire pressure of the tires on the mobile machine to avoid additional soil compaction in the root zones.

5. The mobile machine of claim 1 wherein the mobile machine includes an alert/user interface (UI) system that controls a user interface to generate an interface on the mobile machine and wherein the control signal generator comprises:
   alert/UI signal generation logic configured to generate an alert/UI control signal to control the alert/UI system to generate the interface on the mobile machine indicative of an operator action to avoid additional soil compaction in the root zones.

6. The mobile machine of claim 1 wherein the sensitive area identifier comprises:
   plant locator logic configured to sense plant location and generate a plant location signal indicative of the plant location; and
   root zone extrapolator logic configured to generate a geographic root zone indicator indicative of a geographic position of an estimated root zone based on the plant location signal.

7. The mobile machine of claim 1 wherein the yield impact determination system comprises:
   compaction impact correlation logic configured to generate a correlation metric indicative of a correlation between the soil compaction and the crop yield of the crop; and
   projected yield adjustment logic that adjusts a projected yield for the crop based on the correlation metric and the compaction stress map.

8. The mobile machine of claim 1 wherein the mapping system comprises:
   top soil compaction stress mapping logic configured to generate a compaction stress map for a top soil of the root zones in the agricultural field; and
   subsoil compaction stress mapping logic configured to generate a compaction stress map for a subsoil of the root zones in the agricultural field.

9. The mobile machine of claim 8 and further comprising:
   slip estimation logic configured to detect wheel slip and generate a soil surface/moisture metric indicative of a characteristic of a surface of the soil over which the mobile machine is traveling based on the detected wheel slip, the mapping system generating the compaction stress map based on the soil surface/moisture metric.

10. A method of controlling an agricultural mobile machine that travels over an agricultural field growing a crop, the method comprising:
   accessing a compaction stress map indicative of a soil compaction of soil across the agricultural field;
   generating a plant location signal indicative of plan location of plants in the crop;

generating a geographic root zone indicator indicative of a geographic location of an estimated root zone based on the plant location signal;

sensing a geographic vehicle position of the agricultural mobile machine;

generating a vehicle position signal indicative of the geographic vehicle position of the agricultural mobile machine;

identifying, as a compaction impact, an impact of the soil compaction in the root zone at the agricultural field, on a crop yield of the crop, based on the compaction stress map; and generating a steering control signal to control a steering system on the agricultural mobile machine, in near real time, based on the geographic vehicle position, the geographic location of the estimated root zone and the compaction impact.

11. The method of claim 10 wherein the agricultural mobile machine includes a path planning system that generates a geographic route for the agricultural mobile machine through the agricultural field, a tire pressure system that controls a tire pressure of tires on the agricultural mobile machine, and an alert/user interface (UI) system that controls a user interface to generate an interface on the agricultural mobile machine and wherein generating the control signal comprises one or more of:

generating a path control signal to control the path planning system to generate the geographic route for the agricultural mobile machine to avoid additional soil compaction in the root zone;

generating a tire pressure control signal to control the tire pressure system to control the tire pressure of the tires on the agricultural mobile machine to avoid additional soil compaction in the root zone; or generating an alert/UI control signal to control the alert/UI system to generate the interface on the agricultural mobile machine indicative of an operator action to avoid additional soil compaction in the root zone.

12. An agricultural mobile machine that travels over a field growing a crop, the agricultural mobile machine comprising:

a mapping system that generates a compaction stress map indicative of a soil compaction of soil across the agricultural field;

a sensitive area identifier that identifies, as sensitive areas of the agricultural field, root zones where crop yield of the crop is relatively more sensitive to soil compaction, than at other areas of the agricultural field;

a position sensor configured to sense a geographic vehicle position and generate a vehicle position signal indicative of the geographic vehicle position of the agricultural mobile machine;

a worksite impact determination system that identifies, as a compaction impact, an impact of the soil compaction at the agricultural field, on the crop field, based on the compaction stress map, and the root zones; and a control signal generator that generates a control signal to control a steering system, in near real time, based on the compaction impact, the root zones, and the geographic vehicle position.

* * * * *